United States Patent
Pact et al.

(10) Patent No.: US 11,126,599 B2
(45) Date of Patent: Sep. 21, 2021

(54) INFORMATION VALIDATION METHOD AND SYSTEM

(71) Applicant: Accenture Global Solutions Limited, Dublin (IE)

(72) Inventors: Jim Stephen Pact, Taguig (PH); Perpetuo Cajucom, Kronberg (DE)

(73) Assignee: Accenture Global Solutions Limited, Dublin (IE)

( * ) Notice: Subject to any disclaimer, the term of this patent is extended or adjusted under 35 U.S.C. 154(b) by 133 days.

(21) Appl. No.: 15/414,302

(22) Filed: Jan. 24, 2017

(65) Prior Publication Data

US 2018/0210904 A1 Jul. 26, 2018

(51) Int. Cl.
*G06F 16/215* (2019.01)
*G06F 16/21* (2019.01)

(52) U.S. Cl.
CPC .......... *G06F 16/215* (2019.01); *G06F 16/217* (2019.01)

(58) Field of Classification Search
CPC ................................................ G06F 17/30306
See application file for complete search history.

(56) References Cited

U.S. PATENT DOCUMENTS

| | | | |
|---|---|---|---|
| 6,292,810 B1 | 9/2001 | Richards | |
| 6,636,864 B1 * | 10/2003 | Owen, Jr. | G06F 17/30067 |
| 2001/0020237 A1 * | 9/2001 | Yarnall | G06F 17/30569 |
| 2002/0042795 A1 * | 4/2002 | Smith | G06F 17/30067 |
| 2005/0149911 A1 * | 7/2005 | Nadon | G06F 8/20 717/120 |
| 2008/0307262 A1 * | 12/2008 | Carlin, III | G06F 17/30303 714/37 |
| 2009/0128690 A1 | 5/2009 | Burnett et al. | |
| 2010/0281061 A1 * | 11/2010 | Chen | G06F 17/30303 707/794 |
| 2012/0144392 A1 * | 6/2012 | Freitas | G06F 1/3203 718/100 |
| 2012/0272221 A1 * | 10/2012 | Pessoa | G06F 9/4492 717/127 |

(Continued)

FOREIGN PATENT DOCUMENTS

WO WO 00/058873 10/2000

OTHER PUBLICATIONS

European Patent Office, Extended European Search Report in European Application No. 18150712.0 dated Jun. 5, 2018, pp. 1-10.

(Continued)

*Primary Examiner* — James Trujillo
*Assistant Examiner* — J Mitchell Curran
(74) *Attorney, Agent, or Firm* — Crowell & Moring LLP

(57) ABSTRACT

A method for validating information includes accessing validation rules from a validation rule store and transferring a plurality of received data files and the validation rules to a validation storage space. The method also includes selecting each of the one or more data files defined in the validation configuration file. Each data file includes a plurality of records, each record having values associated with a plurality of attributes. For each data file, the method includes applying the plurality of validation rules to determine valid and invalid content within the data file; and generating a report that specifies the invalid content of each data file.

11 Claims, 12 Drawing Sheets

(56) References Cited

U.S. PATENT DOCUMENTS

| | | | |
|---|---|---|---|
| 2014/0033314 A1* | 1/2014 | Wibbeler | G06F 9/4484 |
| | | | 726/26 |
| 2014/0108357 A1* | 4/2014 | Procops | G06F 40/18 |
| | | | 707/690 |
| 2014/0115013 A1 | 4/2014 | Anderson | |
| 2014/0244569 A1* | 8/2014 | Seto | G06F 16/254 |
| | | | 707/600 |
| 2014/0281917 A1 | 9/2014 | Alpern et al. | |
| 2014/0310231 A1* | 10/2014 | Sampathkumaran | |
| | | | G06F 17/30563 |
| | | | 707/602 |
| 2016/0292206 A1* | 10/2016 | Ruiz Velazquez | |
| | | | G06F 17/30371 |

OTHER PUBLICATIONS

Rahm et al., "Data Cleaning: Problems and Current Approaches" Quarterly Bulletin of the Computer Society of the IEEE Technical Committee on Data Engineering, The Committee, Washington, DC, US, dated Dec. 1, 2000, pp. 1-11.

European Patent Office Examination Report for corresponding European Patent EP 18 150 712.0, dated Mar. 6, 2019, 9p.

* cited by examiner

Dependency Validation Configuration Table

| | FileGroup | ParentFile | ParentField | ChildFile | ChildField | FieldValidity |
|---|---|---|---|---|---|---|
| 1 | Supplier | SupplierOrganizations.csv | SystemID | SupplierIDs.csv | Parent#SystemID | Required |
| 2 | Supplier | SupplierIDs.csv | Value | Supplier.csv | SupplierIDValue | Required |
| 3 | Supplier | Supplier.csv | UniqueName | SupplierLocation.csv | Parent#UniqueName | Required |
| 4 | Supplier | SupplierIDs.csv | Parent#SystemID | SupplierOrganizations.csv | SystemID | Required |
| 5 | Supplier | Supplier.csv | SupplierIDValue | SupplierIDs.csv | Value | Required |
| 6 | Supplier | SupplierLocation.csv | Parent#UniqueName | Supplier.csv | UniqueName | Required |
| 7 | Supplier | SupplierLocation.csv | UniqueName | SupplierLocationSupp | UniqueName | Required |
| 8 | Supplier | SupplierLocationSupplement.csv | UniqueName | SupplierLocation.csv | UniqueName | Not Required |

Dependency | PkList | Duplicates | Circular | Data Type  — 302

The following data dependency discrepancies were found:

| File | Row Number | Column | Value | Reference File | Reference Column |
|---|---|---|---|---|---|
| Company.csv | 0 | ProcurementUnitRefNa... | N/A - missing column | PurchasingUnit.csv | UniqueName |
| Company.csv | 0 | ProcurementUnitRefNa... | N/A - missing column | PurchasingUnit.csv | UniqueName |
| CostCenter.csv | 0 | PurchasingUni | N/A - missing column | PurchasingUnit.csv | UniqueName |
| ERPCommodityCodeM... | 0 | BillTo | N/A - missing column | Address.csv | UniqueName |
| ERPCommodityCodeM... | 0 | Company | N/A - missing column | Company.csv | UniqueName |
| ERPCommodityCodeM... | 0 | CostCenter | N/A - missing column | CostCenter.csv | UniqueName |
| ERPCommodityCodeM... | 0 | Product | Required Value not sp... | | |
| ERPCommodityCodeM... | 0 | Product | Required Value not sp... | | |
| ERPCommodityCodeM... | 0 | Product | Required Value not sp... | | |
| ERPCommodityCodeM... | 0 | Product | Required Value not sp... | | |
| ERPCommodityCodeM... | 0 | Product | Required Value not sp... | | |
| ERPCommodityCodeM... | 0 | Product | Required Value not sp... | | |
| ERPCommodityCodeM... | 0 | Product | Required Value not sp... | | |
| ERPCommodityCodeM... | 0 | Product | Required Value not sp... | | |
| ERPCommodityCodeM... | 0 | Product | Required Value not sp... | | |

Column List Validation Configuration Table

| | Parentfile | Parentfield | Childfile | ListField | Separator |
|---|---|---|---|---|---|
| 1 | | | | | |
| 2 | File1.csv | Column1 | File2.csv | Column1 | — |
| 3 | File1.csv | Column1 | File3.csv | Column3 | — |
| 4 | File1.csv | Column1 | File4.csv | Column5 | , |
| 5 | File8.csv | Column2 | File3.csv | Column4 | ; |
| 6 | File2.csv | Column3 | File9.csv | Column1 | , |

Duplicate Detection Configuration Table

| | A | B |
|---|---|---|
| 1 | File | SpecificColumns |
| 2 | File1.csv | Column1:Column2 |
| 3 | File2.csv | |
| 4 | File3.csv | Column1:Column2:Column3 |
| 5 | File4.csv | |
| 6 | File5.csv | Column10 |
| 7 | File6.csv | Column1 |

... | Duplicates

Fig. 5A

The following duplicates/empty rows were found:

| File | Rows Number | Value | Column |
|---|---|---|---|
| SpecificRowCheck.csv | 2,3 and 4 | ABC | Col1 |

Duplicates Errors Found: 1

Run Start: 2/16/2016 7:00:08 PM
Run End: 2/16/2016 7:00:17 PM

Fig. 5B

Circular Reference Detection Configuration Table

| | A | B | C |
|---|---|---|---|
| | FileName | ParentField | ChildField |
| 1 | | Name | SupervisorName |
| 2 | SharedUserSupervisor.csv | | |
| 3 | | | |

Fig. 6A

The following potential circular references were found:

Value founden of parent column SupervisorName on row 1 of SharedUserSupervisor.csv will form a loop with value founden of child column UniqueName.

Circular Reference Errors Found: 1

Run Start: 2/15/2016 1:16:02 AM
Run End: 2/15/2016 1:16:03 AM

Fig. 6B

Data Type Validation Configuration Table

| | A | B | C | D |
|---|---|---|---|---|
| 1 | File | Field | DataType | format |
| 2 | File1.csv | Column1 | String | |
| 3 | File2.csv | Column2 | Number | |
| 4 | File3.csv | Column3 | Decimal | |
| 5 | File4.csv | Column4 | Date | MM/dd/yyyy,MM/d/yyyy,M/dd/yyyy,M/d/yyyy |
| 6 | File5.csv | Column5 | Date | MM/dd/yyyy |
| 7 | File6.csv | Column6 | Boolean | |

| Data Type | Valid Values | ... |

The following data type discrepancies were found:

| File | Row Number | Column | Value | Expected Format |
|---|---|---|---|---|
| DataTypeTest.csv | 1 | Col1 | Test | String - Max Length: 2 |
| DataTypeTest.csv | 2 | Col2 | NotANumber | Number |
| DataTypeTest.csv | 2 | Col3 | January 1 2016 | Date - MM/dd/yyyy, MM/d/... |
| DataTypeTest.csv | 2 | Col4 | NotABoolean | Boolean |

Data Types Errors Found: 4

Run Start: 2/19/2016 11:18:39 PM
Run End: 2/19/2016 11:19:06 PM

Range Validation Configuration Table

| | A | B | C | D | E | F |
|---|---|---|---|---|---|---|
| 1 | file | Field | RangeType | Lower Limit | Upper Limit | ValueList |
| 2 | File1.csv | Column1 | Range | 387 | | |
| 3 | File2.csv | Column2 | Selection | | | Value1\|Value2\|Value3\|Value4\|Value5 |
| 4 | File3.csv | Column3 | Range | 5000 | 50000 | |
| 5 | File4.csv | Column4 | Range | | 20 | |

... | Data Type | Valid Values | Condition ...

The following invalid values were found:

| File | Row Number | Column | Value | Expected Value |
|---|---|---|---|---|
| ValidValueTest.csv | 2 | Col1 | 21 | Between 10 And 20 |
| ValidValueTest.csv | 2 | Col2 | four | onetwothree |
| ValidValueTest.csv | 2 | Col3 | 20 | > 40 |
| ValidValueTest.csv | 2 | Col4 | 90 | < 80 |
| ValidValueTest.csv | 1 | Col5 | seven | (0,9\|0,9) |

Valid Values Errors Found: 5

Run Start: 2/19/2016 11:21:59 PM
Run End: 2/19/2016 11:22:27 PM

Fig. 8B

Conditional Value Based Validation Configuration Table

| File | ConditionField1 | ConditionValue1 | ConditionField2 | ConditionValue2 | ResultField | ResultValue |
|---|---|---|---|---|---|---|
| ConditionTest.csv | Col1 | ABC | | | ResultCol | PASS |
| ConditionTest.csv | Col3 | GHI | Col2 | DEF | ResultCol | PASS |
| ConditionTest.csv | Col4 | JKL | | | ResultCol | PASS |

The following incorrect expected results were found:

| File | Row Number | Column | Value | Expected Value |
|---|---|---|---|---|
| ConditionTest.csv | 2 | ResultCol | FAIL | PASS |
| ConditionTest.csv | 4 | ResultCol | FAIL | PASS |

Conditional Values Errors Found: 2

Run Start: 2/16/2016 7:00:09 PM
Run End: 2/16/2016 7:00:17 PM

INFORMATION VALIDATION METHOD AND SYSTEM

BACKGROUND

Field

This application generally relates to information systems. In particular, this application describes an information validation method and system.

Description of Related Art

Master Data Management (MDM) systems are typically utilized to aggregate data from multiple sources, organize the data, and then to generate master data that may be considered as containing authoritative data for consumption by other systems and users of those systems. Such systems typically allow users to access a subset of information stored in the master data via a portal or view. For example, the portal may provide a view with information associated with a single consumer, employee, product, etc.

The volume of data stored such system presents a challenge when considering how to validate the data. For example, the data stored in these systems might span fifty or more comma-separated value (CSV) files and each file may have in excess of 10,000records. Validating dependences, finding duplicate data, confirming valid types, etc., within these records is a time-consuming, cumbersome process.

BRIEF SUMMARY

In one aspect, a method for validating information includes accessing validation rules from a validation rule store and transferring a plurality of received data files and the validation rules to a validation storage space. The method also includes selecting each of the one or more data files defined in the validation configuration file. Each data file includes a plurality of records, each record having values associated with a plurality of attributes. For each data file, the method includes applying the plurality of validation rules to determine valid and invalid content within the data file; and generating a report that specifies the invalid content of each data file.

In a second aspect, a system for validating information includes a processor and a non-transitory computer readable medium. The non-transitory computer readable medium includes instruction code that when executed causes processor to receive data that defines a validation configuration file. The validation configuration file defines a plurality of validation rules and one or more data files upon which the validation rules are to be applied. The processor also selects each of the one or more data files defined in the validation configuration file. Each data file includes a plurality of records, each record having values associated with a plurality of attributes. For each data file, the processor applies the plurality of validation rules to determine valid and invalid content within the data file and generate a report that specifies the invalid content of each data file.

In a third aspect, a non-transitory computer readable medium having instruction code stored thereon for validating information. The instruction code is executable by a machine for causing the machine to perform acts that include receive data that defines a validation configuration file. The validation configuration file defines a plurality of validation rules and one or more data files upon which the validation rules are to be applied. The machine also selects each of the one or more data files defined in the validation configuration file. Each data file includes a plurality of records, each record having values associated with a plurality of attributes. For each data file, the machine applies the plurality of validation rules to determine valid and invalid content within the data file and generates a report that specifies the invalid content of each data file.

BRIEF DESCRIPTION OF THE DRAWINGS

FIG. 3A illustrates an exemplary dependency validation configuration table for configuring dependency validation operations of an information validation system (IVS) of the environment;

FIG. 3C illustrates an exemplary report that may be generated after the dependency validation operations have been performed;

FIG. 4 illustrates an exemplary column list validation configuration table for configuring column list based validation operations of the IVS;

FIG. 5A illustrates an exemplary duplicate detection configuration table for configuring duplicate detection validation operations of the IVS;

FIG. 5B illustrates an exemplary report that may be generated after the duplicate detection validation operations have been performed;

FIG. 6A illustrates an exemplary circular reference detection configuration table for configuring circular reference detection validation operations of the IVS;

FIG. 6B illustrates an exemplary report that may be generated after the circular reference detection validation operations have been performed;

FIG. 7A illustrates an exemplary data type validation configuration table for configuring data type validation operations of the IVS;

FIG. 7B illustrates an exemplary report that may be generated after the data type validation operations have been performed;

FIG. 8A illustrates an exemplary range validation configuration table for configuring range validation operations of the IVS;

FIG. 8B illustrates an exemplary report that may be generated after the range validation operations have been performed;

FIG. 9A illustrates an exemplary conditional value based validation configuration table for configuring conditional value based validation operations of the IVS;

FIG. 9B illustrates an exemplary report that may be generated after the range validation operations have been performed;

DETAILED DESCRIPTION

Figure 1:
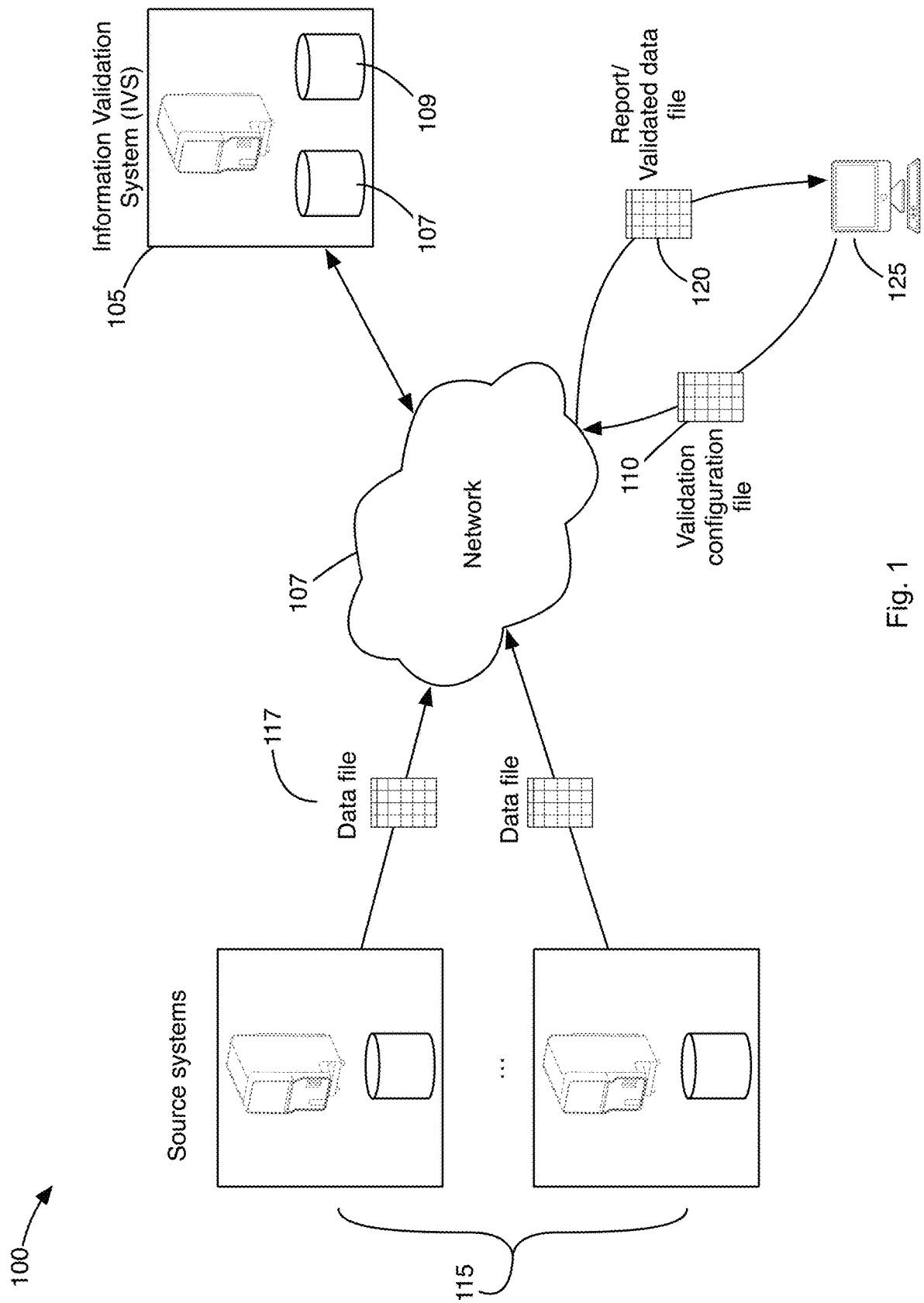
FIG. 1 illustrates an exemplary environment in which a system for information validation system may operate.

FIG. 1 illustrates an exemplary environment 100 in which an information validation system (IVS) 105 for validating information may operate. Illustrated are the IVS 105, a group of data sources 115, and a terminal 125. As illustrated, the various components of the environment 100 may communicate with one another via a network 107 such as the Internet.

The information validation system (IVS) 105, the various source systems 115, and the terminal 125 correspond generally to computer systems such as Intel®, AMD®, or PowerPC® based computers or a different computers. The processor(s) within each system may host an operating system such as Microsoft Windows®, Linux, or other Unix® based operating system. The various systems may be configured to communicate with one another via an interface, such as a network interface.

The source systems 115 generally correspond to computer systems that store data, such as enterprise resource planning (ERP) systems that perform business process management (e.g., SAP®, Oracle®, PeopleSoft®). For example, each data source 115 may store data in the form of database records or a different format. Each record or entry in the database may define various attributes/fields and values associated with the attributes/fields. In this regard the data in the data sources 115 may be thought of as a table of rows and columns, where the column header specifies the different attributes of the record, each row corresponds to a record, and each cell corresponds to a field value of the record.

Each source system 115 may provide an API to facilitate remote access to the data stored within the source system 115. For example, the API may include functions for generating a data file 117 that include one or more records matching certain field criteria. The data file 117 may be communicated in a standardized format such as a comma-separated value (CSV) format, common interchange format (CIF), and/or a different format.

The IVS 105 is generally configured to retrieve data files 117 from one or more source systems 115, validate information stored therein according to validation rules specified in a validation configuration file (VCF) 110, and generate a report 120 and/or a validated data file. The VCF 110 may be communicated to the IVS 105 from the terminal 125 or may be specified directly within the IVS 105. The VCF 110 may be stored in a validation rule store 107 of the IVS 105, which facilitates sharing VCFs 110 among different users.

The IVS 105 may host a tool configured to coordinate the validation operations. In some implementations, the IVS 105 includes a validation storage space 109 for storing a VCF 110 and data files 117 specified therein for further processing as described below.

Figure 2:
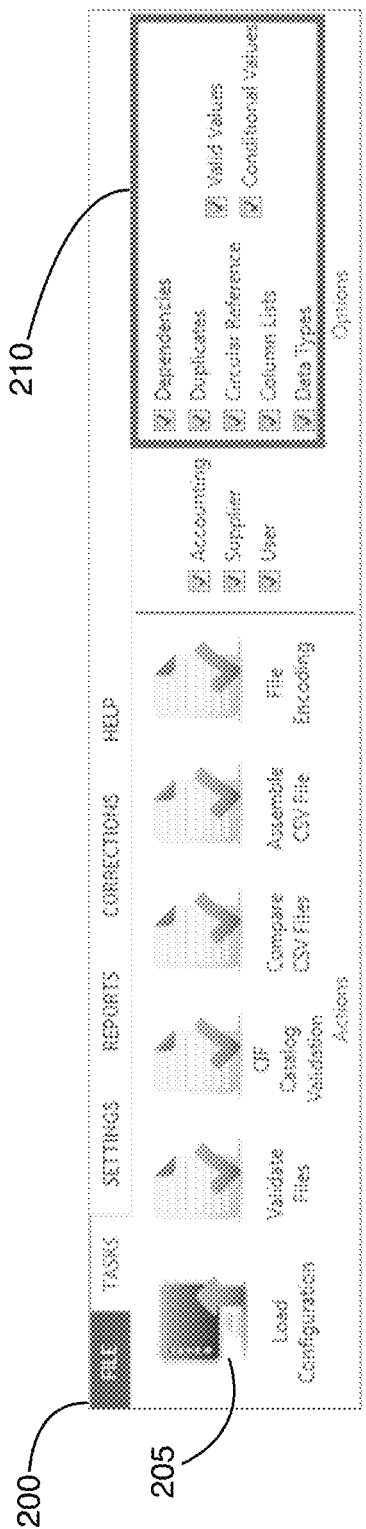
FIG. 2 illustrates an exemplary user interface of a tool executed by an information validation system (IVS) of the environment.

FIG. 2 illustrates an exemplary user interface 200 of the tool. The user interface 200 includes a load configuration widget 205 for loading a VCF 110 and a validation operation selector 210 for selecting the types of validation operations to perform.

Figure 3B:
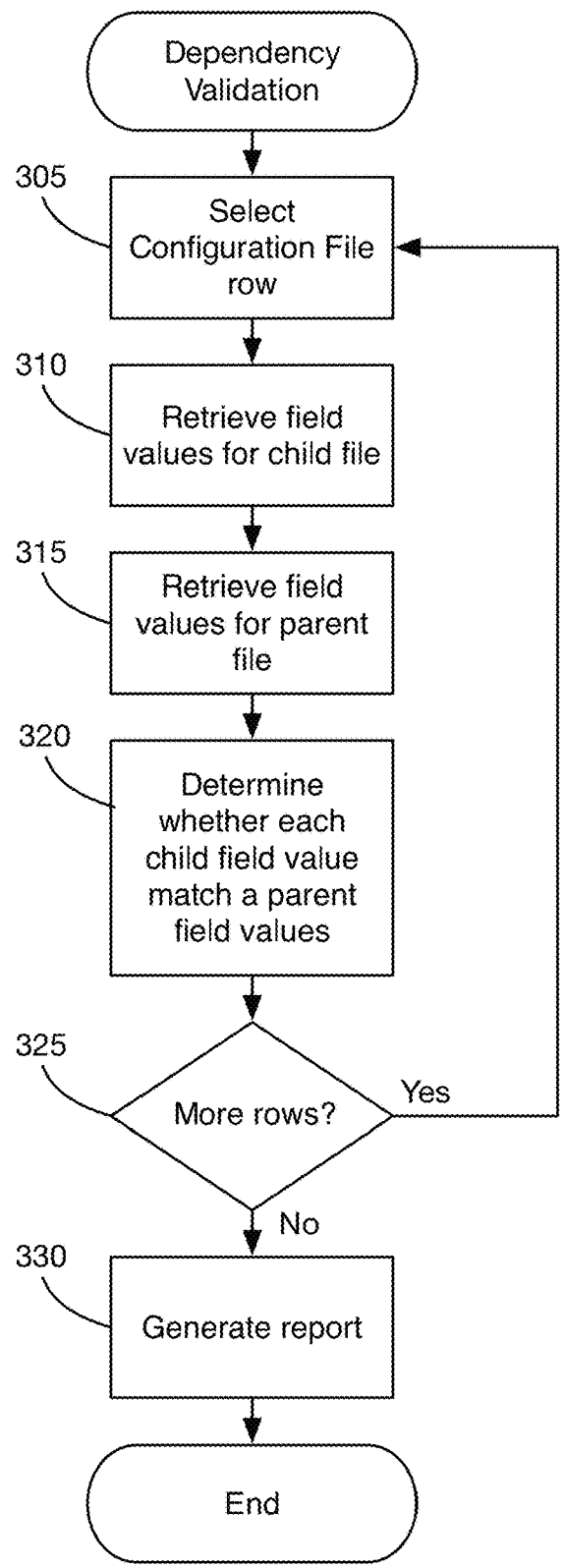
FIG. 3B illustrates exemplary dependency validation operations performed by the IVS.

FIGS. 3A-3C illustrate aspects of an exemplary VCF 110 that may be loaded via the user interface 200. Referring to FIG. 3A, the VCF 110 may correspond to a spreadsheet with different tabs 302 that facilitate selecting different spreadsheet tables within the workbook. Each spreadsheet table may include one or more rules for configuring one of several validation operations.

FIG. 3A illustrates a rule table 300 for configuring dependency validation operations of the IVS 105. FIG. 4 illustrates a rule table 400 for configuring column list based validation operations of the IVS 105. FIG. 5A illustrates a rule table 500 for configuring duplicate detection validation operations of the IVS 105. FIG. 6A illustrates a rule table 600 for configuring circular reference detection validation operations of the IVS 105. FIG. 7A illustrates a rule table 700 for configuring data type validation operations of the IVS 105. FIG. 8A illustrates a rule table 800 for configuring range validation operations of the IVS 105. FIG. 9A illustrates a rule table 900 for configuring conditional value based validation operations of the IVS 105. While the configuration information described above is specified within different tables of a spreadsheet, it is understood that the data may be provided differently. For example, the information within each table may be provided via different configuration files and the file format need not be table based.

Various operations performed by the IVS 105 in processing the VCF 110 are described below. In this regard, in some implementations the IVS 105 may include non-transitory memory that includes instruction code for causing one or more processors of the IVS 105 to perform one or more these operations.

Dependency validation operations are illustrated in FIG. 3B. Referring to FIG. 3B, at block 305, a first row may be selected from the rule table 300 for configuring dependency validation operations of the IVS 105. As illustrated, the table 300 includes fields/columns for a parent file, parent field, child file, and child field within each row. Also included are file group and field validity columns. Corresponding field values are provided in each row.

At block 310, values associated with the attribute specified in the ChildField column within the corresponding file specified by the ChildFile attribute are retrieved. For example, when processing the sixth row in the rule table 300, the values associated with the attribute Value of records stored in child file SupplierIDs.csv may be retrieved. In this regard, the IVS 105 may communicate a request to a source system 115 that stores the child file data to communicate the requested values and/or the entire file to the IVS 105.

Table 1 below illustrates an exemplary version of child file SupplierIDs.csv. The values 4015, 4815, and 4820 under the Value column may be retrieved by the IVS 105 when the IVS 105 requests the values associated with the Value attribute of records of the file.

TABLE 1

SupplierIDs.csv

| Parent#System | Domain | Value |
|---|---|---|
| sid481 | Internal Supplier | 4015 |
| sid481 | Duns | 4815 |
| sid481 | Network ID | 4820 |

At block 315, values associated with the attribute specified in the ParentField column within the corresponding file specified by the ParentFile attribute are retrieved. Following the example above, values associated with the attribute SupplierIDValue of records stored in child parent file Supplier.csv may be retrieved. In this regard, the IVS 105 may communicate a request to a source system 115 that stores the parent file data to communicate the requested values and/or the entire file to the IVS 105.

Table 2 below illustrates an exemplary version of the exemplary parent file Supplier.csv. In this case, the values 4015, 4815, and 4814 under the SupplierIDValue column may be retrieved by the IVS 105 when the IVS 105 requests the values associated with the SupplierIDValue attribute of records of the file.

TABLE 2

| Supplier.csv | | | |
|---|---|---|---|
| Unique Name | Name | Supplier ID Value | Payment Terms |
| 4015 | EPrint Technology | 4015 | 10000 |
| 4815 | Manpower | 4815 | 10003 |
| 4814 | EPrint Technology | 4814 | 10001 |

At block 320, the IVS 105 determines whether the values retrieved from the child file match any of the values retrieved from the parent file. Following the example above, the IVS 105 determines whether the values 4015, 4815, and 4820 from the Value column of file SupplierIDs.csv match any of the values 4015, 4815, and 4814 from the SupplierIDValue column of file Supplier.csv. In this case, the first two values from file SupplierIDs.csv are a subset of the values of the SupplierIDValue column of file Supplier.csv. However, the third value, 4820, is not. Therefore, the IVS 105 may determine the value, 4820, or the entire row within which the value was found (i.e., third row) to be invalid.

At block 325, if there are additional rows within the rule table 300 to process, then the next row may be selected at block 300 and the operations may repeat.

After the rows have been processed, at block 330 a report may be generated to indicate any of the child files, rows within the child files, and/or values with the rows determined to be invalid. FIG. 3C illustrates an exemplary report 350 that may be generated.

Dependency validation operations based on column lists (See FIG. 4) are similar to the dependency validation operations described above. However, in this case the attribute of each record in the child file being validated specifies a list of items rather than a single item. For example, each row in the column list validation configuration table 400 illustrated in FIG. 4 includes fields/columns for ParentFile, ParentField, ChildFile, ListField and Separator. The Separator value within a given row specifies a character (e.g., "|") used for separating items of a list that is specified as the corresponding ListField attribute (e.g., Column1) within a record of the corresponding ChildFile (e.g., File2.csv). Table 3 below illustrates records of an exemplary version of file File2.csv.

TABLE 3

| File2.csv | | | |
|---|---|---|---|
| Record # | Column1 | Column2 | Column3 |
| 1 | 4015 \| 4815 \| 4820 | aaa | bbb |
| 2 | 4015 \| 4815 \| 4814 | ccc | ddd |
| 3 | 4015 \| 4815 \| 4814 | eee | fff |

In operation, for each row in the column list validation configuration table 400, the IVS 105 determines whether each item of the corresponding ListField attribute (e.g., Column1) of each record of the corresponding ChildFile (e.g., File2.csv) matches a corresponding ParentField attribute (e.g., Column1) of a record within the corresponding ParentFile (e.g., File1.csv). If one or more of the items in the list do not match the corresponding ParentField attribute (e.g., Column1) specified in a record of the corresponding ParentFile (e.g., File1.csv), the list may be considered invalid, or at least the particular item in the list that is missing may be considered invalid. This information may be reported as described above in block 325.

Operations for detecting duplicates are configured according to the duplicate detection configuration table 500 in FIG. 5. Referring to FIG. 5, the table 500 includes fields/columns File and SpecificColumns. In operation, for each row in the duplicate detection configuration table 500, the IVS 105 detects duplicates within the corresponding File attribute (e.g., File1.csv) according to the corresponding SpecificColumn attribute (e.g., Column1:Column2) of the row the table 500. For example, the first row in the duplicate detection configuration table 500 configures the IVS 105 to retrieve a file File1.csv and determine whether two or more records within the file have the same values for attributes Column1 and Column2 of the respective records. If more than two records are found, the extra records are considered to be duplicates. As illustrated in FIG. 5B, a report 505 may be generated to indicate any detected problems.

Operations for detecting circular references are configured according to the circular reference detection configuration table 600 in FIG. 6A. Referring to FIG. 6A, the table 600 includes fields/columns FileName, ParentField, and ChildField. The FileName attribute of each row specifies a file in which circular references are to be detected. The ParentField and ChildField attributes for each row specify attributes within records of the file that may define a nested relationship with other records of the file. For example, the first row in the circular reference detection configuration table configures the IVS 105 to search for circular references within a file named SharedUserSupervisor.csv for which attributes Name and Supervisor Name of each record may form a nested relationship with other records within the file.

Table 4 is illustrative. As shown in Table 4, the supervisor of a person specified in the first row (i.e., kstabler) is jmadden. The supervisor of person specified in the second row (i.e., jmadden) is prozelle. The supervisor of person specified in the third row (i.e., prozelle) is kstabler, who happens to be the person specified in the first row. Thus, the collection of records in Table 4 forms a circular loop with respect to the Name and SupervisorName attributes. As illustrated in FIG. 6B, a report 605 may be generated to indicate any detected problems.

TABLE 4

| SharedUserSupervisor.csv | | |
|---|---|---|
| Record # | Name | SupervisorName |
| 1 | kstabler | jmadden |
| 2 | jmadden | prozelle |
| 3 | prozelle | kstabler |

Operations for performing data type validation are configured according to the data type validation configuration table 700 in FIG. 7A. Referring to FIG. 7A, the table 700 includes File, Field, DataType, and Format fields/columns. In operation, for each row in the data type validation configuration table 700, the IVS 105 determines whether the data type of a corresponding field/attribute (e.g., Column4) of records within the corresponding File attribute (e.g., File4.csv) match a corresponding DataType attribute (e.g., Date) and corresponding Format attribute (e.g., MM/dd/yyyy). For example, the fourth row in the data type validation configuration table 700 configures the IVS 105 to determine whether the attribute Column4 of records in file File4.csv are of a type Date, and whether the attribute format is one of MM/dd/yyyy, MM/d/yyyy, M/dd/yyyy, and M/D/ yyyy. Mismatches in the type and/or the specified format may be reported as illustrated in the exemplary report 705 of FIG. 7B.

Operations for performing range validation are configured according to the range validation configuration table 800 in FIG. 8A. Referring to FIG. 8A, the table 800 includes File, Field, RangeType, LowerLimit, UpperLimit, and ValueList fields/columns. In operation, for each row in the range validation configuration table 800, the IVS 105 determines whether the value of a corresponding field/attribute (e.g., Column1) of records within the corresponding File attribute (e.g., File1.csv) fall within a corresponding RangeType attribute (e.g., Date), LowerLimit attribute (e.g., 387), UpperLimit attributes and/or ValueList attribute. For example, the first row in the range validation configuration table 800 configures the IVS 105 to determine whether the value of attribute Column1 of records in file File1.csv are greater than the LowerLimit attribute 387. The second row in the range validation configuration table 800 configures the IVS 105 to determine whether the value of attribute Column2 of records in file File3.csv corresponds to one of Value 1-Value 5 specified as the ValueList attribute in the second row. When the values do not conform to the constraints defines in the range validation configuration table 800, the issue may be reported as illustrated in the report 805 of FIG. 8B.

Operations for performing conditional value based validation are configured according to the conditional value based validation configuration table 900 in FIG. 9A. Referring to FIG. 9A, the table 900 includes File, ConditionField1, ConditionValue1, ConditionField2, ConditionValue2, ResultField, and ResultValue fields/columns. In operation, for each row in conditional value based validation configuration table 900, the IVS 105 determines whether the corresponding ConditionField1 attribute (e.g., Col1) of records within the corresponding File attribute (e.g., ConditionTest.csv) equal the corresponding ConditionValue1 attribute (e.g., ABC) of the records. Likewise, the IVS 105 determines whether the corresponding ConditionField2 attribute (e.g., Col2) of records within the corresponding File attribute (e.g., ConditionTest.csv) equal the corresponding ConditionValue2 attribute (e.g., DEF) of the records. Additional ConditionField/ConditionValue pairs may be specified. Within a given row, if the various corresponding ConditionFields equal the corresponding ConditionValues, then the IVS 105 determines whether the value of the corresponding ResultField attribute (e.g., ResultCol) of the records equals the corresponding Result Value attribute (e.g., Pass). If this is the case, then a given record within the file is determined to be valid. Otherwise, the record is determined to be invalid.

For example, the first row in the conditional value based validation configuration table 900 configures the IVS 105 to determine that when the Col 1 and Col2 attributes of records within the ConditionTest.csv equal ABC and DEF, respectively, the value for the ResultCol attribute of the records should be PASS. When this is the case, a record is determined to be valid. If not, the record is determined to be invalid. When the values do not conform to the constraints defined in the range validation configuration table 900, the issue may be reported as illustrated by the report 905 in FIG. 9B.

Referring back to FIG. 2, the tool hosted on the IVS 105 may be configured to cause the IVS 105 to perform other operations. For example, the IVS 105 may be configured to correct and/or isolate problems within files, compare files to one another, assemble new csv files, and encode files. For example, in correcting files, the tool may be configured to cause the IVS 105 to remove entries with dependency issues, columns that are not present, columns that are added, but that have no data. Duplicate entries, entries causing hierarchy loops, entries with data type issue, entries with invalid values, and entries with incorrect expected values may be removed.

In comparing csv files, the IVS 105 may compare the contents of the files and display the results. The result may indicate all the lines present in a first file that are not present in a second file or vice versa. The IVS 105 is configured such that the comparison may be insensitive to the position of the entries within the files. For example, an entry on the third row of a first file that exists on the eight row of a second file may not be flagged.

In assembling new csv files, the IVS 105 retrieve specific attributes from records within different data file and merge the attributes together into new records in a new file. The source files and the attributes to merge along with a destination file may be specified in a configuration file, such as the VCF 110.

Figure 10:
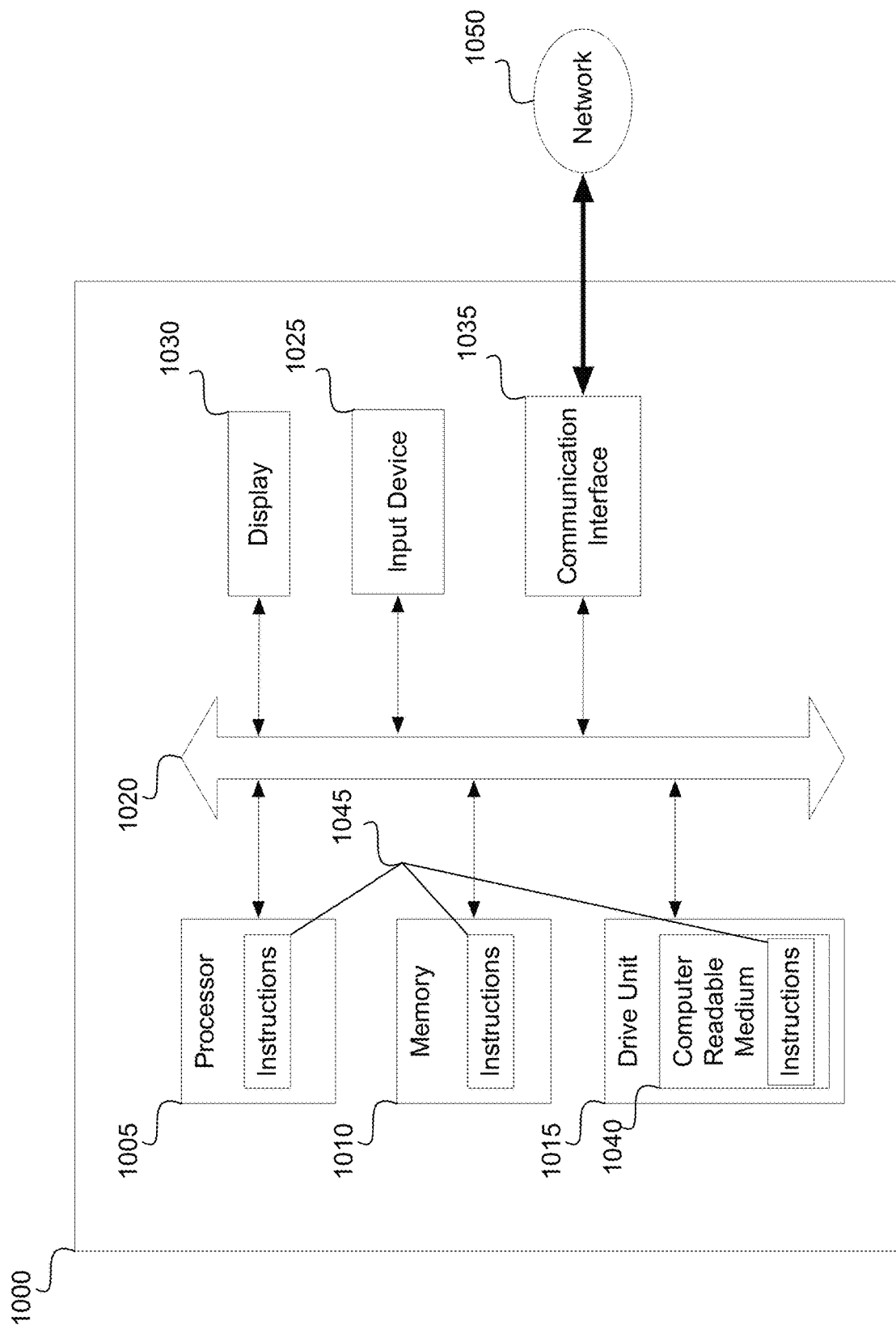
FIG. 10 illustrates an exemplary computer system that may form part of or implement the systems described in the figures or in the following paragraphs.

FIG. 10 illustrates a computer system 1000 that may form part of or implement the systems described above. The computer system 1000 may include a set of instructions 1045 that the processor 1005 may execute to cause the computer system 1000 to perform any of the operations described above. The computer system 1000 may operate as a stand-alone device or may be connected, e.g., using a network, to other computer systems or peripheral devices.

In a networked deployment, the computer system 1000 may operate in the capacity of a server or as a client-user computer in a server-client user network environment, or as a peer computer system in a peer-to-peer (or distributed) network environment. The computer system 1000 may also be implemented as or incorporated into various devices, such as a personal computer or a mobile device, capable of executing the instructions 1045 (sequential or otherwise) that specify actions to be taken by that machine. Further, each of the systems described may include any collection of sub-systems that individually or jointly execute a set, or multiple sets, of instructions to perform one or more computer functions.

The computer system 1000 may include one or more memory devices 1010 on a bus 1020 for communicating information. In addition, code operable to cause the computer system to perform any of the operations described above may be stored in the memory 1010. The memory 1010 may be a random-access memory, read-only memory, programmable memory, hard disk drive or any other type of memory or storage device.

The computer system 1000 may include a display 1030, such as a liquid crystal display (LCD), a cathode ray tube (CRT), or any other display suitable for conveying information. The display 1030 may act as an interface for the user to see the functioning of the processor 1005, or specifically as an interface with the software stored in the memory 1010 or in the drive unit 1015.

Additionally, the computer system 1000 may include an input device 1025, such as a keyboard or mouse, configured to allow a user to interact with any of the components of system 1000.

The computer system 1000 may also include a disk or optical drive unit 1015. The disk drive unit 1015 may include a computer-readable medium 1040 in which the instructions 1045 may be stored. The instructions 1045 may reside completely, or at least partially, within the memory 1010 and/or within the processor 1005 during execution by the computer system 1000. The memory 1010 and the processor 1005 also may include computer-readable media as discussed above.

The computer system 1000 may include a communication interface 1035 to support communications via a network 1050. The network 1050 may include wired networks, wireless networks, or combinations thereof. The communication interface 1035 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As noted above, the embodiments provide an intuitive and flexible user interface that facilitates specification and design of rules, by a user, for validating data files. The data files can be of any time such as CSV, Excel® and/or any other data file for which information stored therein can be represented in tabular form.

In addition, storing the rules to the validation rule store facilitates sharing the rules with other users.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for validating information comprising:
    accessing a validation configuration file specifying validation rules and one or more data files upon which the validation rules are to be applied, the validation configuration file accessed from a validation rule store, the validation rule store accessible to different users, wherein the validation configuration file specifies an attribute of a plurality of records in a first data file for which corresponding values are to be validated, and an attribute of records in a second data file against which the values in the first data file are to be validated;
    transferring a plurality of received data files and the validation rules to a validation storage space;
    selecting each of the one or more data files defined in the validation configuration file, wherein each data file includes a plurality of records, each record having values associated with a plurality of attributes;
    generating a user interface to allow a user to individually select a plurality of validation rules to be applied to the selected each of the one or more data files;
    receiving input from the user interface corresponding to the selected plurality of validation rules;
    for each data file, applying the selected validation rules to determine valid and invalid content within the data file;
    wherein the validation rules include a plurality of user-selectable rules for:
    validating dependencies between different data files, identifying duplicate information within a data file, identifying circular references within a data file that defines hierarchies of information, identifying field values of a data file having a wrong type, and identifying field values of a data file that are out of a range;
        wherein the different data files include a parent data file and a child data file, a child list field in the child data file has dependency on a parent field in the parent data file the validation rules for validating dependencies between the different data files includes instructions for identifying from a row in the validation configuration file the parent data file, the parent field, the child data file, the child list field, and a separator separating multiple items of a list in the child list field, retrieving the multiple items from the child list field from the child data file according to the separator, retrieving attributes of the parent field from the parent data file, determining whether each item of the multiple items retrieved from the child list field matches the corresponding parent field attribute, and determining that the list is invalid when an item of the multiple items of the list does not match the parent field attribute;
        wherein the validation rules for identifying circular references within a data file that defines hierarchies of information specify a plurality of attributes of records within the data file defining a nested relationship among records of the data file, wherein when the records of the data file form a circular loop with respect to the plurality of attributes, the records are determined to be invalid;
        wherein the validation rules for identifying values of a data file that are out of a range specify one or more attributes of records within the data file and one or more ranges associated, respectively, with the one or more attributes, wherein when values of a record that are associated with the one or more attributes are not within the corresponding ranges, the record is determined to be invalid, and wherein when values of a record that are associated with the one or more attributes are within the corresponding ranges, the record is determined to be valid;
    generating a report that specifies the invalid content of each data file;
    retrieving specific attributes from the valid content within different data files of the one or more data files, and merging the specific attributes to generate one or more new data files that include the valid content of the one or more data files, to thereby provide valid versions of the one or more data files; and
    wherein the specific attributes, the different data files from which the specific attributes are retrieved and the new data file are specified in the validation configuration file.

2. The method according to claim 1, wherein the validation rules for duplicate information within a data file specify one or more attributes within records of the data file, wherein when values of a first record associated with the one or more attributes match values of a second record associated with the one or more attributes, the second record is determined to be a duplicate record.

3. The method according to claim 1, wherein the validation rules for identifying field values of a data file having a wrong type specify one or more attributes of records within the data file and one or more types associated, respectively, with the one or more attributes, wherein when values of a record that are associated with the one or more attributes are not of the corresponding types, the record is determined to be invalid.

4. The method according to claim 1, wherein the validation rules are pre- defined by a user.

5. The method according to claim 1, further comprising storing the validation rules in the rule store in a spreadsheet.

6. A system for validating information comprising:
a processor; and
a non-transitory computer readable medium that includes instruction code that when executed causes processor to:
receive data that defines a validation configuration file, wherein the validation configuration file specifies validation rules and one or more data files upon which the validation rules are to be applied, wherein the validation configuration file specifies an attribute of a plurality of records in a first data file for which corresponding values are to be validated, and an attribute of a record in a second data file against which the values in the first data file are to be validated;
transfer a plurality of received data files and the validation rules to a validation storage space;
select each of the one or more data files defined in the validation configuration file, wherein each data file includes a plurality of records, each record having values associated with a plurality of attributes;
generate a user interface to allow a user to individually select a plurality of validation rules to be applied to the selected each of the one or more data files;
receive input from the user interface corresponding to the selected plurality of validation rules;
for each data file, apply the selected validation rules to determine valid and invalid content within the data file; and
wherein the validation rules include a plurality of user-selectable rules for:
validating dependencies between different data files, identifying duplicate information within a data file, identifying circular references within a data file that defines hierarchies of information, identifying field values of a data file having a wrong type, and identifying field values of a data file that are out of a range;
wherein the different data files include a parent data file and a child data file, a child list field in the child data file has dependency on a parent field in the parent data file the validation rules for validating dependencies between the different data files includes instructions for identifying from a row in the validation configuration file the parent data file, the parent field, the child data file, the child list field, and a separator separating multiple items of a list in the child list field, retrieving the multiple items from the child list field from the child data file according to the separator, retrieving attributes of the parent field from the parent data file, determining whether each item of the multiple items retrieved from the child list field matches the corresponding parent field attribute, and determining that the list is invalid when an item of the multiple items of the list does not match the parent field attribute;
wherein the validation rules for identifying circular references within a data file that defines hierarchies of information specify a plurality of attributes of records within the data file defining a nested relationship among records of the data file, wherein when the records of the data file form a circular loop with respect to the plurality of attributes, the records are determined to be invalid;
wherein the validation rules for identifying values of a data file that are out of a range specify one or more attributes of records within the data file and one or more ranges associated, respectively, with the one or more attributes, wherein when values of a record that are associated with the one or more attributes are not within the corresponding ranges, the record is determined to be invalid, and wherein when values of a record that are associated with the one or more attributes are within the corresponding ranges, the record is determined to be valid;
generate a report that specifies the invalid content of each data file;
retrieve specific attributes from the valid content within different data files of the one or more data files, and merge the specific attributes to generate one or more new data files that include the valid content of the one or more data files, to thereby provide valid versions of the one or more data files; and
wherein the specific attributes, the different data files from which the specific attributes are retrieved and the new data file are specified in the validation configuration file.

7. The system according to claim 6, wherein the validation rules for duplicate information within a data file specify one or more attributes within records of the data file, wherein when values of a first record associated with the one or more attributes match values of a second record associated with the one or more attributes, the second record is determined to be a duplicate record.

8. The system according to claim 6, wherein the validation rules for identifying field values of a data file having a wrong type specify one or more attributes of records within the data file and one or more types associated, respectively, with the one or more attributes, wherein when values of a record that are associated with the one or more attributes are not of the corresponding types, the record is determined to be invalid.

9. A non-transitory computer readable medium having instruction code stored thereon for validating information, the instruction code being executable by a machine for causing the machine to perform acts comprising:
receiving data that defines a validation configuration file, wherein the validation configuration file validation rules and one or more data files upon which the validation rules are to be applied, wherein the validation configuration file specifies an attribute of a plurality of records in a first data file for which corresponding values are to be validated, and an attribute of a record in a second data file against which the values in the first data file are to be validated;
transferring a plurality of received data files and the validation rules to a validation storage space;
selecting each of the one or more data files defined in the validation configuration file, wherein each data file includes a plurality of records, each record having values associated with a plurality of attributes;

generating a user interface to allow a user to individually select a plurality of validation rules to be applied to the selected each of the one or more data files;

receiving input from the user interface corresponding to the selected plurality of validation rules;

for each data file, applying the selected validation rules to determine valid and invalid content within the data file;

wherein the validation rules include a plurality of user-selectable rules for:

validating dependencies between different data files, identifying duplicate information within a data file, identifying circular references within a data file that defines hierarchies of information, identifying field values of a data file having a wrong type, and identifying field values of a data file that are out of a range;

wherein the different data files include a parent data file and a child data file, a child list field in the child data file has dependency on a parent field in the parent data file the validation rules for validating dependencies between the different data files includes instructions for identifying from a row in the validation configuration file the parent data file, the parent field, the child data file, the child list field, and a separator separating multiple items of a list in the child list field, retrieving the multiple items from the child list field from the child data file according to the separator, retrieving attributes of the parent field from the parent data file, determining whether each item of the multiple items retrieved from the child list field matches the corresponding parent field attribute, and determining that the list is invalid when an item of the multiple items of the list does not match the parent field attribute;

wherein the validation rules for identifying circular references within a data file that defines hierarchies of information specify a plurality of attributes of records within the data file defining a nested relationship among records of the data file, wherein when the records of the data file form a circular loop with respect to the plurality of attributes, the records are determined to be invalid;

wherein the validation rules for identifying values of a data file that are out of a range specify one or more attributes of records within the data file and one or more ranges associated, respectively, with the one or more attributes, wherein when values of a record that are associated with the one or more attributes are not within the corresponding ranges, the record is determined to be invalid, and wherein when values of a record that are associated with the one or more attributes are within the corresponding ranges, the record is determined to be valid;

generating a report that specifies the invalid content of each data file;

retrieving specific attributes from the valid content within different data files of the one or more data files, and merging the specific attributes to generate one or more new data files that include the valid content of the one or more data files, to thereby provide valid versions of the one or more data files; and wherein the specific attributes, the different data files from which the specific attributes are retrieved and the new data file are specified in the validation configuration file.

10. The non-transitory computer readable according to claim 9, wherein the validation rules for duplicate information within a data file specify one or more attributes within records of the data file, wherein when values of a first record associated with the one or more attributes match values of a second record associated with the one or more attributes, the second record is determined to be a duplicate record.

11. The method according to claim 1, wherein the validation rules further include a condition value based validation rule for identifying values of a data file failing to meet a value condition, the condition value based validation rule specifies one or more attributes of records within the data file and one or more condition values associated, respectively, with the one or more attributes, wherein when values of a record that are associated with the one or more attributes are not equal to the corresponding condition values, the record is determined to be invalid, and wherein when values of a record that are associated with the one or more attributes are equal to the corresponding condition values, the record is determined to be valid.

* * * * *